Sept. 8, 1970     A. GAMP     3,527,486
DOWEL-SLEEVE ASSEMBLY
Filed June 24, 1968     2 Sheets-Sheet 1
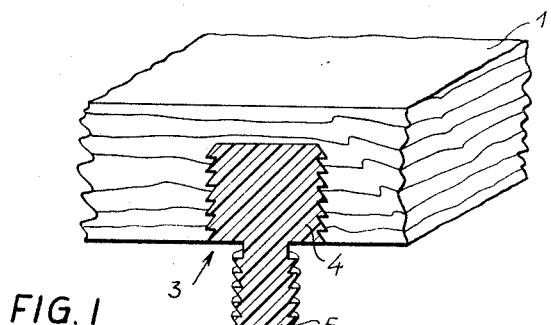
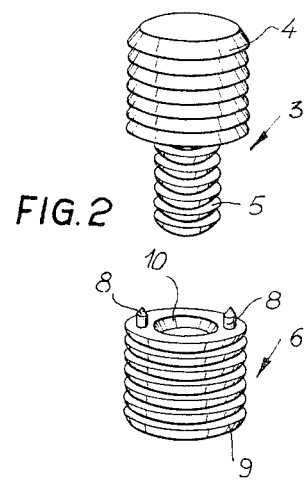
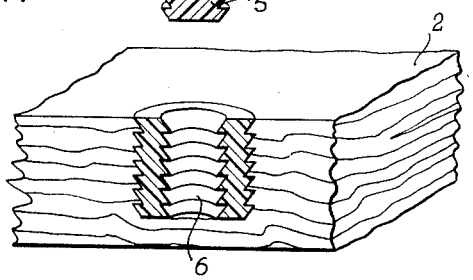
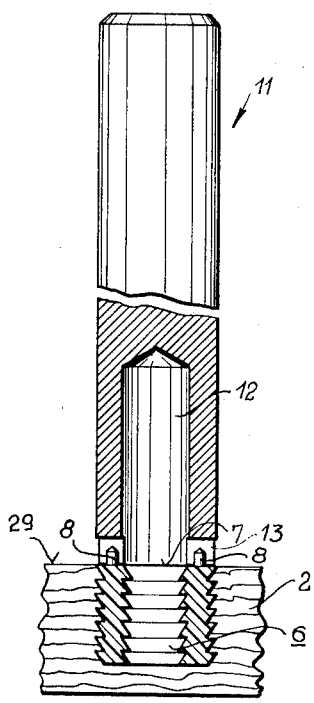
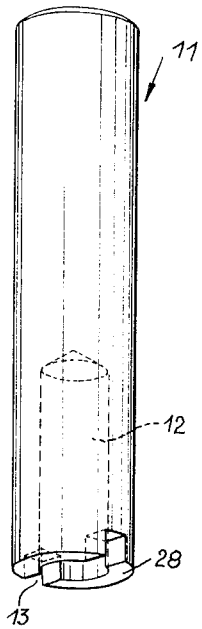
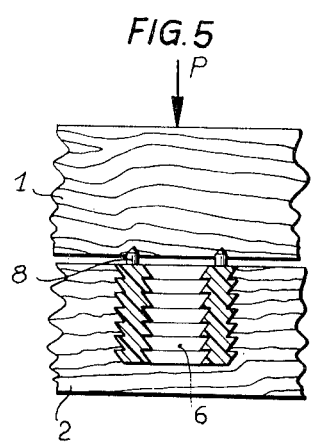
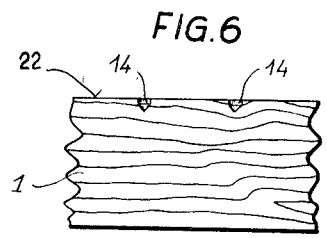
Anton Gamp INVENTOR.
BY *Karl G. Ross*
*Attorney*

Sept. 8, 1970  A. GAMP  3,527,486
DOWEL-SLEEVE ASSEMBLY
Filed June 24, 1968  2 Sheets-Sheet 2
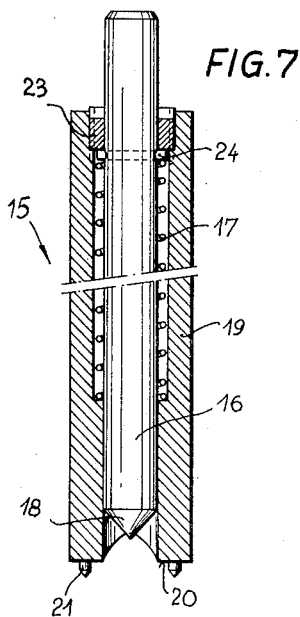
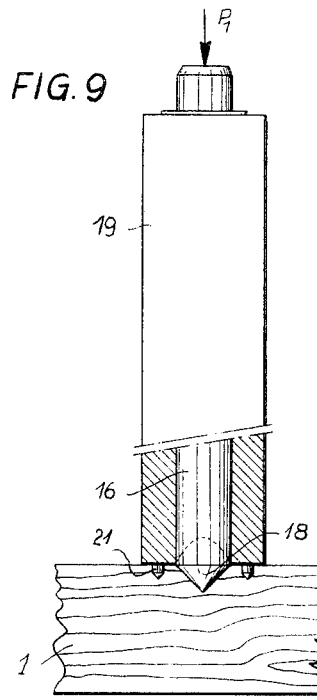
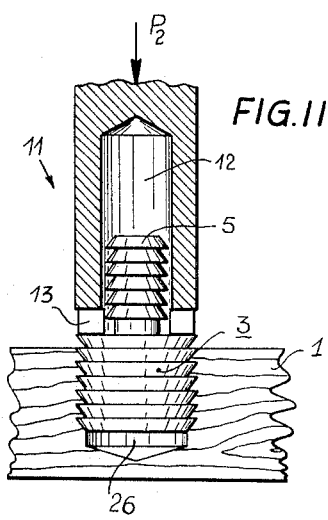
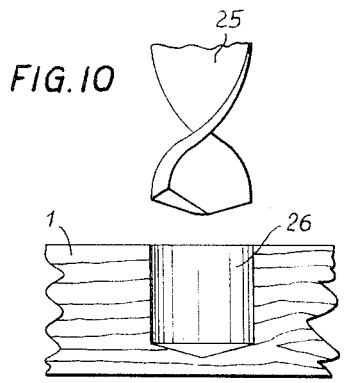
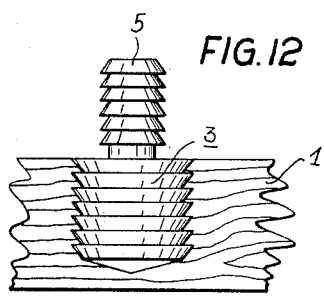
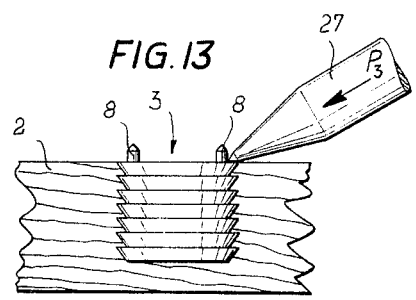
Anton Gamp INVENTOR.
BY Karl G. Ross
Attorney

United States Patent Office 3,527,486
Patented Sept. 8, 1970

3,527,486
DOWEL-SLEEVE ASEMBLY
Anton Gamp, Mariazellerstr. 36 NO.,
Traisen, Austria
Filed June 24, 1968, Ser. No. 739,267
Claims priority, application Austria, June 27, 1967,
A 5,956; Mar. 8, 1968, A 2,328/68
Int. Cl. F16b 13/00
U.S. Cl. 287—20.92                                    3 Claims

ABSTRACT OF THE DISCLOSURE

The dowel sleeve has an outer end face formed with pointed marking extensions which are adapted to be impressed into said first part when said sleeve is in position in said second part. The first part is thus formed with a marking which facilitates the finding of a center of a bore to be drilled into said first part and serving to receive said dowel pin which is receivable by said sleeve in said second part. A punch sleeve has an end face which is formed with extensions that are receivable by said marking. A center punch slidably mounted in said punch sleeve serves to mark out the center of said bore.

---

This invention relates to a dowel sleeve for receiving a fastening pin for attaching cover strips, door facings, wall facings and the like.

It is an object of the invention to provide a dowel sleeve which facilitates the assembly of such elements.

Another object of the invention is to provide a dowel sleeve which can be used in all structural woodwork, in the manufacture of furniture, in built-in furniture of wood, in furniture combined with doors and walls, in wooden ceilings and in cupboard doors.

Another object of the invention is to provide a dowel sleeve which enables a neat assembly and the provision of smooth surfaces to enable a further processing of the visible faces.

It is a general object of the invention to ensure a coincidence of the axes of the bores of the two elements forming the doweled joint assembly (sleeve and pin), which elements are to be inserted into different parts, because only in this case can the fastening pin be inserted into the dowel sleeve. In many cases it is not possible to drill both parts at the same time and such drilling would require the use of special fixtures. The above-mentioned object is accomplished by the invention in that the sleeve, which consists preferably of plastic (synthetic resin) materials, is formed on one end face with pointed marking extensions, which are adapted to be impressed into the part which is to be joined to the part which carries the dowel sleeve so that impressed markings are formed which facilitate the finding of the center of the subsequently drilled bore for the fastening pin.

When the sleeve designed according to the invention is first inserted into one of the two parts to be joined and the other of said parts is forced against the sleeve, the extensions on the end face of the sleeve penetrate into the material and mark the position of the bore for receiving the pin. When the center of the bore has been found with the aid of the marking and the bore has been drilled, the pin will exactly enter the bore of the dowel sleeve.

To ensure a firm connection between the dowel sleeve and the fastening pin, it is another feature of the invention to provide the inside surface of the sleeve in known manner with transverse grooves having preferably a toothlike cross-section.

The pointed marking extensions are preferably diametrically opposite each other with respect to the axis of the sleeve.

It is another object of the invention to provide an apparatus for marking out centers of bores to be drilled in wood and serving to receive the sleeve and pin of doweled joints, with the aid of impressions formed by a center punch in the surface to be drilled. The impressions may be produced with the aid of a dowel sleeve of the design mentioned hereinbefore.

According to the invention, the center punch is slidably mounted in a sleeve and can be extended out of the end face of the sleeve, preferably against the pressure of a restoring spring, and the sleeve is provided with extensions for entering the impressions formed in the surface to be drilled. When the tool which is designed according to the invention is used in this way and the sleeve has been applied, a blow may be delivered to the center punch so as to mark out the center of a bore which is exactly centered with respect to the impressions or has a predetermined location relative to said impressions.

The punch sleeve may be located in a particularly reliable manner if, in accordance with another feature of the invention, the extensions consist of cylindrical pins havig conical end portions.

The invention will now be explained more fully with reference to illustrative embodiments which are shown on the drawing and to which the invention is not restricted.

FIG. 1 is a sectional perspective view showing two wooden parts, which are to be connected by a dowel sleeve and dowel pin.

FIG. 2 is a perspective view showing a dowel sleeve and an associated dowel pin before their insertion into the wooden parts to be joined.

FIG. 3 is a perspective view showing a sleeve for driving the dowel sleeve and the dowel pin into the associated wooden parts.

FIG. 4 shows the use of the driving sleeve shown in FIG. 3 for driving the dowel sleeve into a wooden part.

FIG. 5 shows the formation of the markings which facilitate the finding of the center of the bore.

FIG. 6 is a sectional view showing the wooden part provided with the markings.

FIG. 7 is an axial longitudinal sectional view showing the tool for marking out the center of the bore for receiving the dowel pin.

FIG. 8 is a side elevation showing the lower part of the tool shown in FIG. 7.

FIG. 9 shows the marking out of the center of the bore for receiving the dowel pin with the aid of the tool shown in FIGS. 7 and 8.

FIG. 10 is a sectional view showing the part formed with a bore for receiving the dowel pin.

FIG. 11 illustrates the step of inserting the dowel pin into the bore of FIG. 10 with the aid of the tool shown in FIG. 3.

FIG. 12 is a sectional view showing the part which is provided with the dowel pin and FIG. 13 shows the dowel sleeve which is in position in a part to be joined and is still provided with the pointed marking extensions, and a tool for striking off the pointed marking extensions so that the part assumes the form shown in FIG. 1.

FIG. 1 shows two wooden parts 1 and 2, which are to be joined by a plurality of dowel pins, which are forced into dowel sleeves in register therewith. To this end, the relative positions of the individual dowel pins 3 in part 1 must be the same as the relative positions of the dowel sleeves which are inserted in the part 2 and associated with the dowel pins 3. The drawing shows only one dowel sleeve 6 and the associated dowel pin 3. The dowel pin consists of two mutually coaxial, cylindrical sections 4 and 5 which differ in diameter. The cylindrical section 4 which is large in diameter is inserted into a bore in the part 1. The cylindrical section 5 is inserted into the bore of the sleeve 6. The peripheral surfaces of the cylindrical sections 4 and 5 of the dowel pins 3 are provided with grooves and the inside and outside peripheral surfaces 10 and 9 of the dowel sleeve 6 are also formed with grooves. The dowel pin 3 and the sleeve 6 may be made of plastic (synthetic resin) material. The dowel sleeve 6 is provided on one end face 7 with pointed marking extensions 8, which are diametrically opposite each other with respect to the longitudinal axis of the dowel sleeve 6.

FIG. 3 shows the tool 11 for driving the dowel sleeve 6 and the dowel pin 3. The tool 11 is substantially cylindrical and has an inside bore 12, which extends from the end face 28 and which is somewhat larger in diameter than the diameter of the cylindrical section 5 of the dowel pin 3. The end face 28 of the tool 11 is as large as or slightly smaller in diameter than the outside diameter of the end face 7 of the dowel sleeve 6. From the end face 28, a slot 13 extends transversely to the longitudinal axis of the tool 11. The depth of said slot exceeds in height the pointed marking extensions 8 of the dowel sleeve. The width of said slot exceeds the thickness of the pointed marking extensions 8 of the dowel sleeve 6. When it is desired to drive the dowel sleeve 6 into a bore of the part 2, the end face 28 of the tool 11 is applied to the end face 7 of the dowel sleeve 6 in such a position that the pointed marking extensions 8 enter the slot 13 of the tool 11. This is clearly shown in FIG. 4. In this case the driving of the dowel sleeve into the bore of the part 2 will not damage the pointed extensions 8.

The tool is removed when the sleeve 6 has been sufficiently driven into the part 2 to such an extent that the end face 7 is flush with the surface 29 of the part 2, as is shown in FIG. 4. When it is then desired to form the markings in the part 1, the same is applied to the pointed marking extensions 8, as is shown in FIG. 5, and pressure is applied in the direction of the arrow P so that the pointed marking extensions 8 enter the structural part 1 and produce there a marking 14 on the surface 22 of the part 1. This is shown in FIG. 6. With the aid of the marking 14, the center of a bore can be found which is in register with the previously driven sleeve 6 when the parts 1 and 2 assume a predetermined relative position. The tool 15 shown in FIGS. 7 and 8 serves to mark out the bore of the pin 3 which is associated with the sleeve 6. The tool 15 comprises a sleeve 19, in which a center punch 16 having a point 18 is slidable against the pressure of the return spring 17. At the end which is remote from the point 18 of the center punch 16, the latter is guided by a bushing 23, which is adapted to be threaded into the sleeve 19. The center punch 16 can be displaced until its point 18 protrudes beyond the end face 20 of the sleeve 19. The end face 20 has extensions 21, which are spaced like the pointed marking extensions 8 of the dowel sleeve 6 so that the extensions 21 can enter the depressed markings 14 in part 1. This is shown in FIG. 9. Pressure applied to the center punch 16 in the direction of the arrow $P_1$ causes the point 18 of the center punch to penetrate into part 1 and to assume the position shown in FIG. 9. The point 30 of a drill 25 is then inserted into the recess which has been formed in part 1 by the point 18 of the center punch and the drill 25 is operated to produce a hole 26 (FIG. 10) in part 1. FIG. 11 shows how the dowel pin 3 is forced into the hole 26 by means of the tool 11 in the direction of arrow $P_2$ until the dowel pin 3 has assumed in part 1 the position which is shown in FIG. 12 and in which the cylindrical portion 5 of the dowel pin 3 protrudes from part 1.

FIG. 13 shows a tool 27 for striking off the pointed marking extensions 8 from the dowel sleeve 3 which is inserted into part 2. These pointed marking extensions 8 are struck off when they have been used to form in part 1 the markings 14 which are shown in FIG. 6.

The invention may be embodied in different forms. For instance, the dowel pin 3 may be inserted into part 1 to a larger depth than is shown in FIGS. 1 and 12, provided that care is taken that the cylindrical section 5 of the dowel pin 3 sufficiently protrudes from the part 1 to engage the bore of the dowel sleeve 6 which has been inserted into part 2.

What is claimed is:

1. A dowel-sleeve assembly for interconnecting two members, comprising:
   (a) a cylindrical dowel sleeve having an outer end face provided with a pair of axially extending diametrically opposed marking projections adapted to be impressed into one of said members when said sleeve is inserted into a bore of the other of said members, said sleeve having a longitudinal bore through its center, the outer and inner peripheral surfaces of said sleeve being formed with grooves, said grooves in said inner surface being transverse and in the shape of a sawtooth in cross-section; and
   (b) a dowel pin including two mutually coaxial cylindrical sections of different diameters, the wider of said sections having a diameter substantially equivalent to the diameter of said sleeve and being inserted into a bore of said one member, the other of said sections being inserted into said longitudinal bore of said sleeve, the peripheral surfaces of said sections being provided with grooves.

2. A dowel-sleeve assembly according to claim 1 wherein said sleeve and said pin are made of synthetic-resin material.

3. An intermediate product in the construction of a multiboard assembly, comprising:
   (a) a plastically-deformable board provided with a bore extending from the top surface of said board to a given depth inside said board;
   (b) a cylindrical dowel sleeve of synthetic-resin material having a longitudinal hole through its center, the outer and inner peripheral surfaces of said sleeve being formed with grooves, said grooves in said inner surface being transverse and in the shape of a sawtooth in cross-section, said sleeve being of a height equal to the depth of said bore in said board and being driven into said board through said bore; and
   (c) a pair of marking projections of relatively non-deformable material carried diametrically opposed and extending axially on the end face of said sleeve, said projections protruding above said top surface of said board.

References Cited

UNITED STATES PATENTS

| | | | |
|---|---|---|---|
| 2,240,268 | 4/1941 | Ruddy | 164—235 |
| 3,251,260 | 5/1966 | Serdechny | 85—7 |

FOREIGN PATENTS

| | | |
|---|---|---|
| 651,985 | 11/1962 | Canada. |
| 1,238,727 | 7/1960 | France. |
| 325,461 | 2/1930 | Great Britain. |

EDWARD C. ALLEN, Primary Examiner